United States Patent
Hoefken

(10) Patent No.: US 8,408,783 B2
(45) Date of Patent: Apr. 2, 2013

(54) HORIZONTAL AGITATOR

(75) Inventor: Marcus Hoefken, Erlangen (DE)

(73) Assignee: Invent Umwelt-und Verfahrenstechnik AG, Erlangen (DE)

( * ) Notice: Subject to any disclaimer, the term of this patent is extended or adjusted under 35 U.S.C. 154(b) by 795 days.

(21) Appl. No.: 12/449,323

(22) PCT Filed: Feb. 14, 2008

(86) PCT No.: PCT/EP2008/001129
§ 371 (c)(1),
(2), (4) Date: Aug. 31, 2009

(87) PCT Pub. No.: WO2008/101633
PCT Pub. Date: Aug. 28, 2008

(65) Prior Publication Data
US 2010/0133174 A1 Jun. 3, 2010

(30) Foreign Application Priority Data
Feb. 19, 2007 (DE) .......................... 10 2007 008 135

(51) Int. Cl.
*B01F 9/14* (2006.01)
(52) U.S. Cl. .................. 366/261; 366/285; 366/302
(58) Field of Classification Search .............. 366/262, 366/264, 270, 330.1, 660.3, 660.6, 660.7, 366/331
See application file for complete search history.

(56) References Cited

U.S. PATENT DOCUMENTS

| | | | | | |
|---|---|---|---|---|---|
| 17,646 | A | * | 6/1857 | Taylor | 366/270 |
| 660,185 | A | * | 10/1900 | Franklin | 366/270 |
| 865,128 | A | * | 9/1907 | Smith | 416/175 |
| 1,255,944 | A | * | 2/1918 | Stevens | 366/270 |
| 1,351,352 | A | * | 8/1920 | Stevens | 366/149 |
| 1,399,699 | A | * | 12/1921 | Donauer | 366/330.3 |
| 1,875,597 | A | * | 9/1932 | Heath | 416/230 |
| 1,919,588 | A | * | 7/1933 | Heath | 416/238 |
| 2,134,571 | A | * | 10/1938 | Morlock | 422/227 |
| 2,428,411 | A | * | 10/1947 | Davis | 384/149 |
| 2,690,294 | A | * | 9/1954 | Cary | 417/423.15 |
| 2,978,233 | A | * | 4/1961 | Davey | 366/262 |
| 3,108,146 | A | * | 10/1963 | Gross | 261/24 |
| 3,229,896 | A | * | 1/1966 | Levy | 417/423.8 |
| 3,365,178 | A | * | 1/1968 | Bood | 261/25 |
| 3,481,586 | A | * | 12/1969 | Roberts | 366/264 |
| 3,532,327 | A | * | 10/1970 | Landberg | 366/270 |
| 3,704,868 | A | * | 12/1972 | Weis | 261/91 |
| 3,887,169 | A | * | 6/1975 | Maynard | 366/307 |
| 4,378,165 | A | * | 3/1983 | Landberg | 366/270 |
| 4,416,549 | A | * | 11/1983 | Kretschmer | 366/190 |
| 4,431,597 | A | * | 2/1984 | Cramer et al. | 261/93 |

(Continued)

FOREIGN PATENT DOCUMENTS

DE 39 31 918 A1 1/1991
DE 40 15 478 C1 8/1991

(Continued)

*Primary Examiner* — Tony G Soohoo
(74) *Attorney, Agent, or Firm* — Manabu Kanesaka

(57) ABSTRACT

The invention relates to a horizontal agitator for producing a flow in a clearing basin, wherein a propeller (2) comprising a plurality of blades (4) is connected to a submersible motor (1) disposed axially thereto. In order to increase the efficiency of the horizontal agitator, according to the invention plate-shaped flow conducting elements (8) extending in at least one axial plane are provided downstream of the propeller (2).

13 Claims, 5 Drawing Sheets

U.S. PATENT DOCUMENTS

| | | | | |
|---|---|---|---|---|
| 4,437,765 | A | * | 3/1984 | Seeger ............................ 366/264 |
| 4,454,077 | A | * | 6/1984 | Litz ................................. 261/91 |
| 4,459,030 | A | * | 7/1984 | Weetman ....................... 366/262 |
| 4,464,259 | A | * | 8/1984 | Cramer et al. ................. 210/219 |
| 4,511,257 | A | * | 4/1985 | Roberts .......................... 366/262 |
| 4,566,801 | A | * | 1/1986 | Salzman ......................... 366/343 |
| 4,571,090 | A | * | 2/1986 | Weetman et al. .............. 366/270 |
| 4,581,182 | A | * | 4/1986 | Cramer et al. .................. 261/93 |
| 4,594,006 | A | * | 6/1986 | Depeault ........................ 366/266 |
| 4,627,791 | A | * | 12/1986 | Marshall .................... 416/132 R |
| 4,671,872 | A | * | 6/1987 | Cramer et al. ................. 210/219 |
| 4,722,608 | A | * | 2/1988 | Salzman et al. ............ 366/330.5 |
| 4,802,771 | A | * | 2/1989 | Weetman ....................... 366/270 |
| 4,954,295 | A | * | 9/1990 | Durda .............................. 261/16 |
| 5,145,254 | A | * | 9/1992 | Hovstadius .................... 366/286 |
| 5,300,261 | A | * | 4/1994 | Von Berg ........................ 261/87 |
| 5,505,541 | A | * | 4/1996 | Kihara ............................ 366/264 |
| 5,595,475 | A | * | 1/1997 | Weiss et al. ................. 416/223 R |
| 6,076,812 | A | * | 6/2000 | Lisi ................................. 261/92 |
| 6,231,268 | B1 | * | 5/2001 | Hausenbauer .................. 405/61 |
| 6,247,837 | B1 | * | 6/2001 | Wardberg ...................... 366/129 |
| 6,802,643 | B1 | * | 10/2004 | Cato et al. ...................... 366/262 |
| 6,964,511 | B2 | * | 11/2005 | Rumph ........................... 366/261 |
| 8,210,738 | B2 | * | 7/2012 | Hoefken ...................... 366/330.3 |
| 2003/0156492 | A1 | * | 8/2003 | Rumph ........................... 366/270 |
| 2007/0268779 | A1 | * | 11/2007 | Himmelsbach ............ 366/330.3 |

FOREIGN PATENT DOCUMENTS

| | | |
|---|---|---|
| DE | 195 31 941 A1 | 5/1996 |
| EP | 0 295 247 B1 | 5/1992 |
| WO | WO 99/20523 | 4/1999 |

* cited by examiner

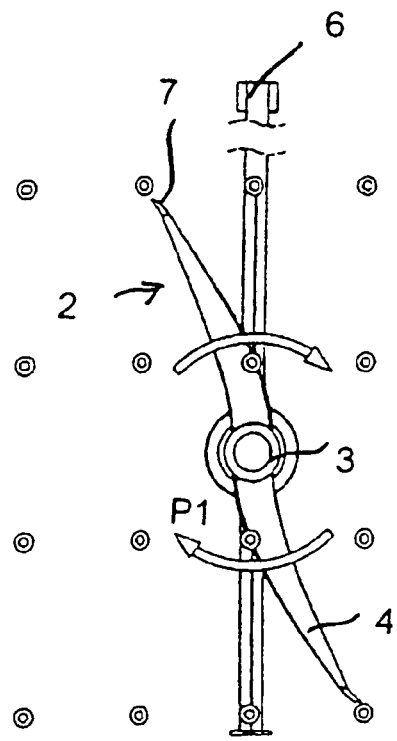
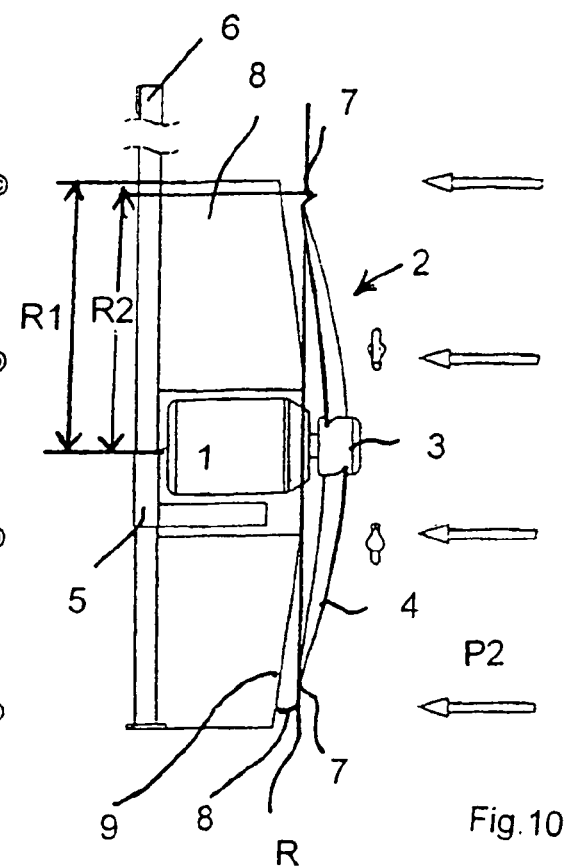
Fig. 9
Fig. 10
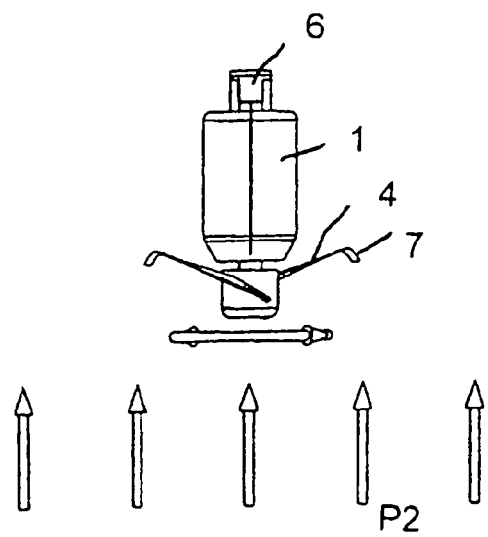
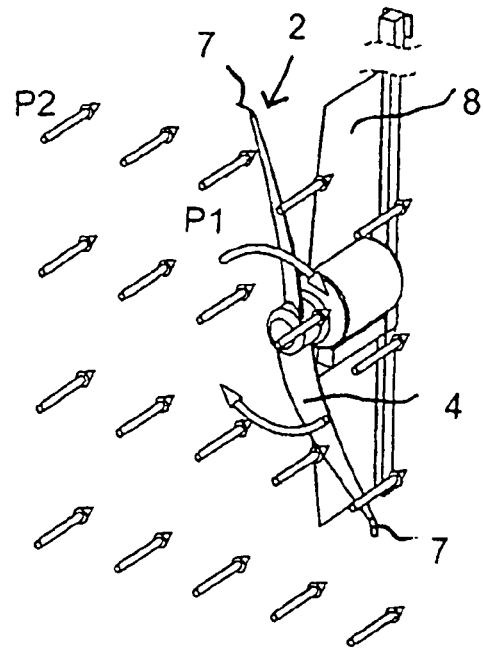
Fig. 11
Fig. 12

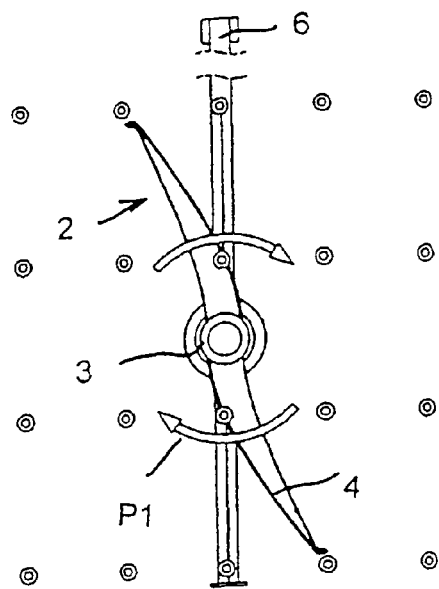
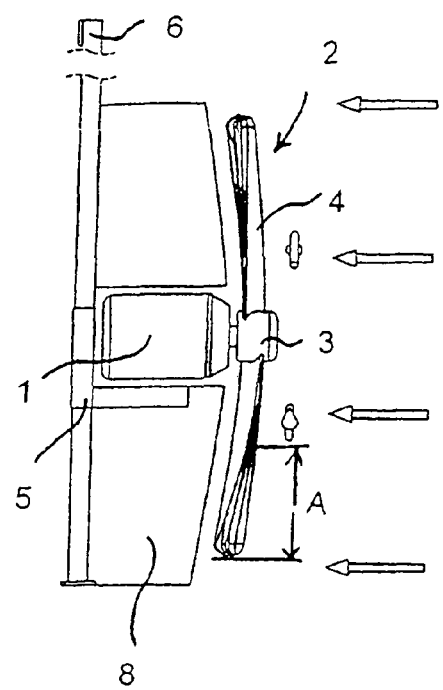
Fig. 13
Fig. 14
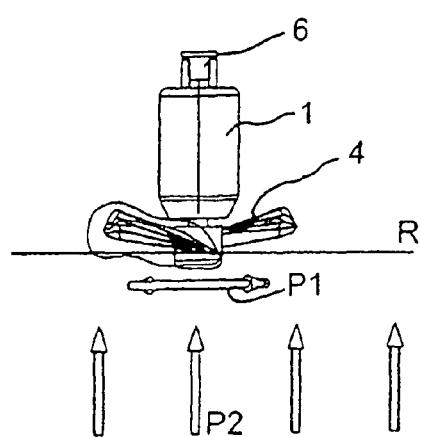
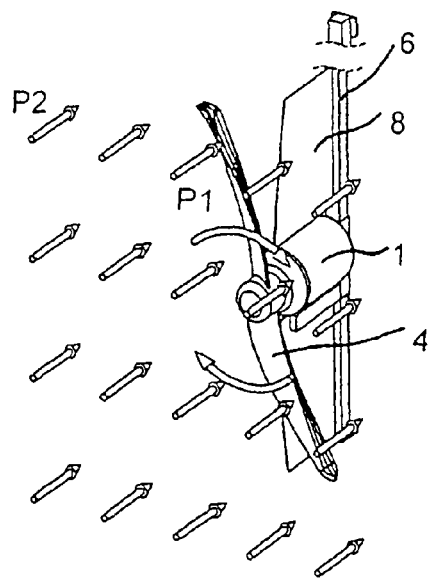
Fig. 15
Fig. 16

HORIZONTAL AGITATOR

BACKGROUND OF THE INVENTION

The invention relates to a horizontal agitator as defined by the first embodiment.

A horizontal agitator is known from DE 40 15 478 C1. In this connection a propeller is connected to a drive unit. The drive unit comprises a submersible motor which usually drives the propeller via a gear unit. In this connection the submersible motor is arranged axially to the propeller i.e., a drive shaft of the submersible motor runs essentially parallel to a rotary axis of the propeller.

In addition, horizontal agitators are also known which, although the submersible motor is axially displaced in relation to the propeller, it is not, however, arranged in a horizontal plane running through a rotary axis of the propeller, i.e., in this case, the submersible motor is arranged either below or above the horizontal plane running through the rotary axis of the propeller.

Conventional horizontal agitators are attached to a frame which is mounted in the vicinity of the wall of a clearing basin or on a bridge. A horizontal flow directed from the submersible motor or from the frame to the propeller is produced by the action of the propeller.

The efficiency of the known horizontal agitators is not particularly high. Apart from this, conventional horizontal agitators are not particularly universal. To obtain the best possible efficiency, it is, in accordance with prior art, required to select a suitable propeller based on the size of the clearing basin and to operate this propeller at a specified speed suitable for this purpose. Each horizontal agitator must thus be designed for the particular application. That is expensive and time-consuming.

DISCLOSURE OF THE INVENTION

An object of the invention is to eliminate the disadvantages in accordance with prior art. In particular, a horizontal agitator is to be specified which can produce a horizontal flow in a clearing basin with improved efficiency. A further goal of the invention is to provide a horizontal agitator which is useable as universally as possible.

This object is solved by the features of the first embodiment. Useful embodiments result from the features of the other embodiments described later.

According to the provisions of the invention, plate-shaped flow conducting elements extending in at least one axial plane are provided downstream of the at least one propeller. The term "axial plane" is understood to mean a plane which runs parallel to the rotary axis of the propeller or contains the rotary axis. The formation of braided flows is counteracted by the provision of plate-shaped flow conducting elements. Braided flows are not desired since they reduce the efficiency of the agitator.

The flow conducting elements are usefully made of sheet metal or fiber-reinforced plastic. They can extend in a vertical plane and/or a horizontal plane. The flow conducting elements can be attached to a frame holding the submersible motor or also to the bottom of a clearing basin. But the flow conducting elements can also be attached to the submersible motor or to a drive unit comprising the submersible motor. The drive unit can comprise a gear unit, for example, in addition to the submersible motor.

The submersible motor or the drive unit can be fixed to a vertical movement unit provided on the frame. This makes it possible to lift or lower the horizontal agitator in the clearing basin.

In accordance with a further embodiment, it is provided that, with increasing radial distance, a leading edge of the flow conducting elements has an inclination or curve directed to the main flow direction. This ensures that no braid-generating impurities can collect on the flow conducting elements. On the contrary, the flow moves them along the inclined or curved leading edge until they are washed away by the flow conducting element.

In accordance with an advantageous embodiment, it is provided that an elastic deformation of the blades made of elastically deformable material is set so that, at least in the area of a radial, outer section, their profile pitch angle increases in a specified manner with increasing rotation speed. The term "profile pitch angle" is understood to mean an angle with which the blades are set or tilted in relation to a radial plane running vertically to the rotary axis of the propeller. Due to the defined setting of the specified elastic deformation of the blades, it can be achieved that the propeller not only can be operated at a certain rotation speed but also within a rotation speed or number of rotations range with a high efficiency. The pressure of the liquid on the blades increases with increasing rotation speed. Due to their elasticity set in a defined way, a profile pitch angle of the blades increases in a radial, outer area. With this, the profile of the blades adapts to the particular conditions so that a flow can be produced over a wide range of speeds. This makes it possible to operate the suggested horizontal agitator universally in clearing basins of different sizes without having to provide another propeller. This saves manufacturing costs.

The propeller can have two, three, four, five or more blades. The propeller can be a counter-clockwise or clockwise rotating propeller. Usefully, the blades are made of a fiber-reinforced composite material. The matrix of the composite material is usefully made of plastic. This can be conventionally known resins which are suitable for the manufacturing of composite materials, e.g., epoxy resins and similar. As fibers, the composite material can contain carbon and/or aramid and/or highly stretched polyethylene fibers. The setting of the elastic deformation of the blades can be done by the selection, the amount and the arrangement of the fibers. Moreover, the elastic deformation, in particular the elastic change in the profile pitch angle, can be set by the thickness of the profile. To set the desired elastic deformation of a blade, a surface of the blade can be separated into surface elements and a modulus of elasticity can be assigned to each surface element. During manufacturing, the particular modulus of elasticity can then be set by varying the type, amount and arrangement of the fibers as well as the thickness of the profile.

The propeller usefully has a density ranging from 0.9 to 1.1 g/cm$^3$. With this, the density essentially corresponds to the thickness of the liquid medium surrounding the propeller, in particular the waste water to be clarified. The suggested adaptation of the density of the propeller to the surrounding liquid medium prevents a radial force caused by the difference in density from being exerted on the propeller axis. This increases the life of bearings holding the propeller axis.

In accordance with a further advantageous embodiment feature, radial, outer end sections of the blades are bent in a direction opposite to the axial main flow direction produced by the propeller. This can prevent the generation, in the area of the blade ends, of undesired radial and axial side flows opposite to the main flow direction. Such side flows decrease the efficiency of the propeller. The suggested bending of the blade ends is particularly used for rigid blades whose profile pitch angle does not essentially change with increased rotation speed.

The term "end section" is understood to mean a radial, outer area of the blade containing the tip of the blade. The "end section" usually has a shorter radial length than the "radial, outer section." However, it can also be that the "radial, outer section" has the same length as the "end section." With a combination of the elastic deformation of the blades with the bending of the end sections, the blade is designed so that a bending of the end sections opposite to the axial main flow direction still exists even with a maximum elastic deformation of the blades.

In accordance with a further embodiment, the bent end sections have a curve opposite to the rotating direction of the propeller in a radial plane. This provides a simple way to prevent so-called "braid-generating impurities," such as thread, string, hair and similar, from being caught by the bent end section.

It has proven to be useful that the maximum length of the end section is ⅕ of the radius of the blade. Such a length of the end section has already proven to be sufficient to effectively counteract undesired side flows.

It is advantageous that the submersible motor is attached axially to the propeller, i.e., the submersible motor is located downstream of the propeller in the area of a hub of same. The drive shaft of the submersible motor and the rotary axis of the propeller are parallel to or are located on one and the same axis.

In accordance with a further embodiment of the invention, it is provided that the propeller and the submersible motor are configured such that during operation of the submersible motor a flow is produced which is directed from the propeller to the submersible motor. With this, it is surprisingly easy to significantly improve the efficiency of a horizontal agitator. The reason for the improvement of the efficiency is essentially that, in accordance with the subject-matter of the invention, no flow hindrances, in particular the submersible motor as well as a frame for holding the submersible motor, are located on the suctioning side of the propeller. As a result of this, a larger amount of liquid can be suctioned in per time unit and can be accelerated in horizontal direction.

In accordance with a further embodiment, it is provided that two propellers rotating in opposite directions around the same rotary axis are provided to produce the flow directed towards the submersible motor. The one propeller is rotating clockwise and the other propeller is rotating counterclockwise so that, in the sense of this invention, both propellers produce a flow directed towards the submersible motor. The suggested "double propeller arrangement" makes it particularly efficient and simple to counteract the formation of a spiral-shaped or so-called "braided flow."

In accordance with further provisions of the invention, an arrangement to clarify waste water having a clearing basin and having accommodated therein at least one horizontal agitator according to the invention is provided.

BRIEF DESCRIPTION OF THE DRAWING

The invention will now be described in more detail using exemplary embodiments based on the drawings.

DETAILED DESCRIPTION OF THE DRAWINGS

Figures 1, 2:
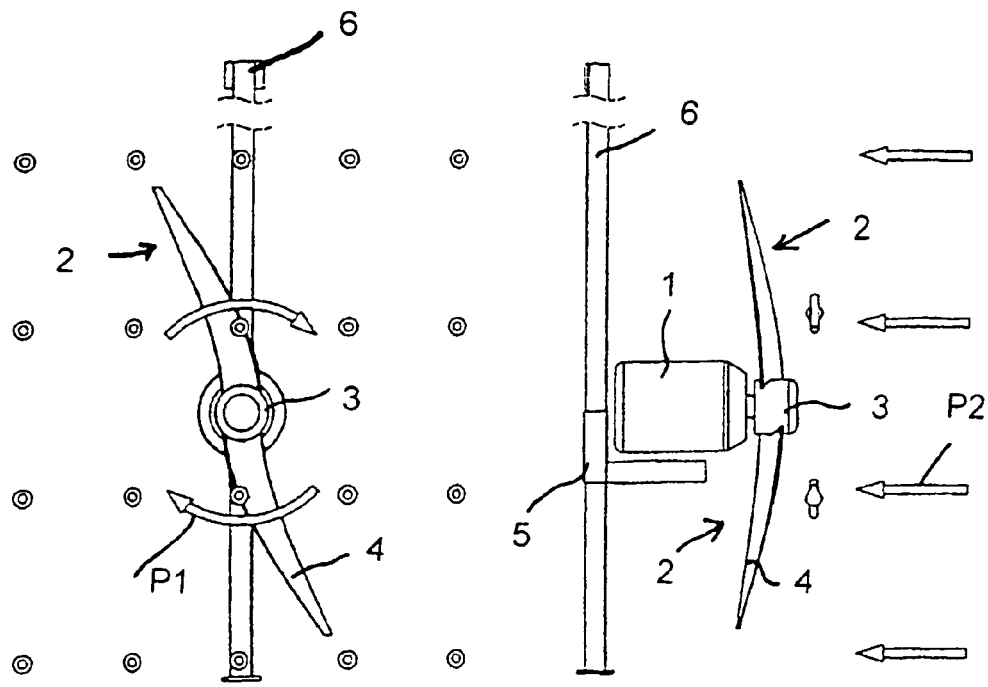
FIG. 1 A front view of a first horizontal agitator,
FIG. 2 a side view as per FIG. 1,
FIG. 3 a top view as per FIG. 1,
FIG. 4 a view in perspective of the first horizontal agitator as per FIG. 1,
FIG. 5 a front view of a second horizontal agitator,
FIG. 6 a side view as per FIG. 5,
FIG. 7 a top view as per FIG. 5,
FIG. 8 a view in perspective of the second horizontal agitator as per FIG. 5,
FIG. 9 a front view of a third horizontal agitator,
FIG. 10 a side view as per FIG. 9,
FIG. 11 a top view as per FIG. 9,
FIG. 12 a view in perspective of the third horizontal agitator as per FIG. 9,
FIG. 13 a front view of a fourth horizontal agitator,
FIG. 14 a side view as per FIG. 13,
FIG. 15 a top view as per FIG. 13,
FIG. 16 a view in perspective of the fourth horizontal agitator as per FIG. 13 and
FIG. 17 a detailed view as per FIG. 16.

With the first horizontal agitator shown in FIGS. 1 to 4, there is a submersible motor 1 connected in axial arrangement to a propeller 2 as a drive. The propeller 2 has two blades 4 extending radially from a hub 3. The submersible motor 1 is mounted on a carriage 5 which can be moved vertically via a (not shown here) vertical movement unit on a column-like frame 6. A possible embodiment of a suitable vertical movement unit is, for example, described in DE 40 15 478 C1 whose disclosure is incorporated herewith.

Figures 3, 4:
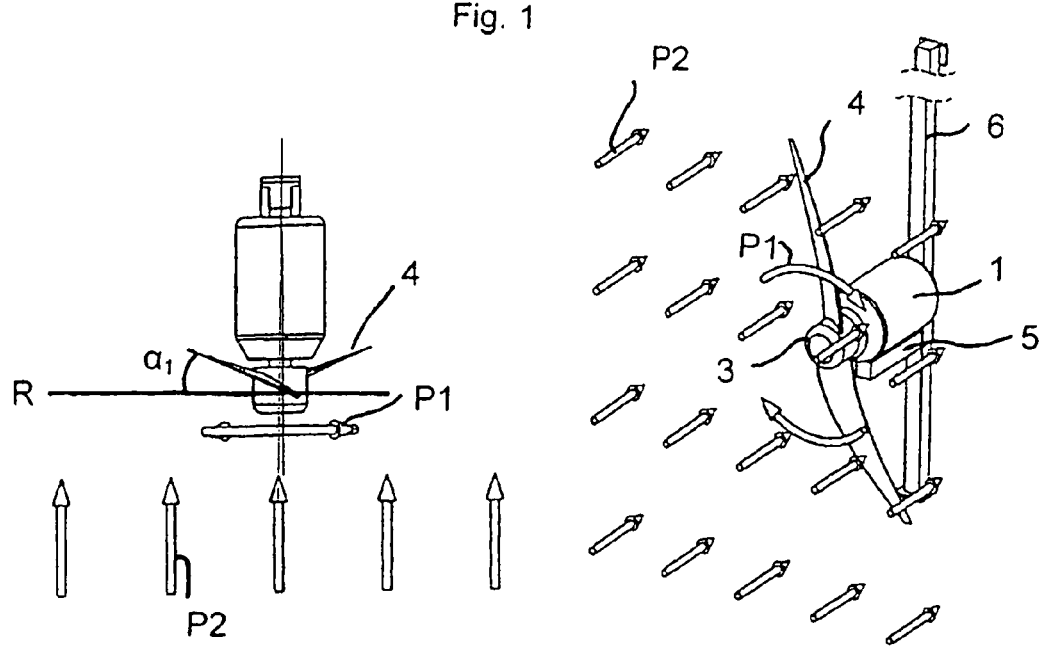
Figure 5:
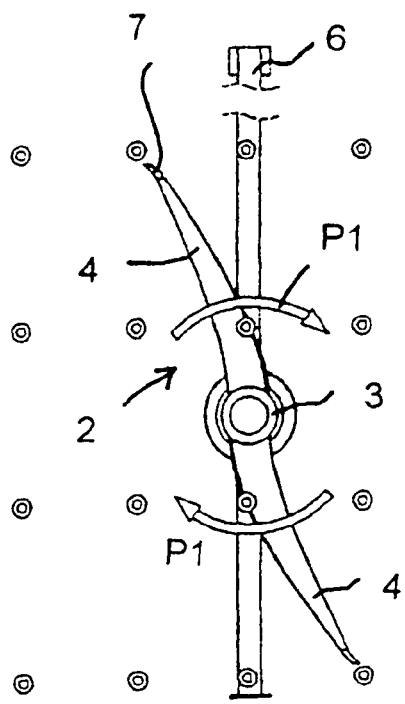
Figure 6:
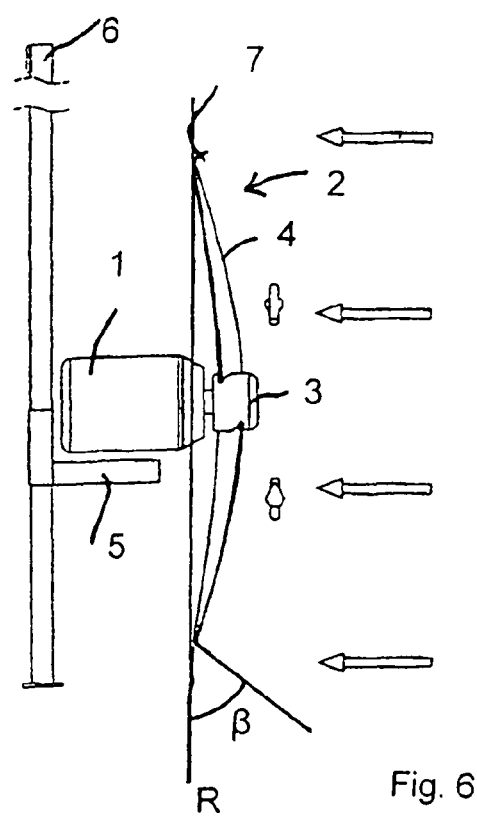
Figure 7:
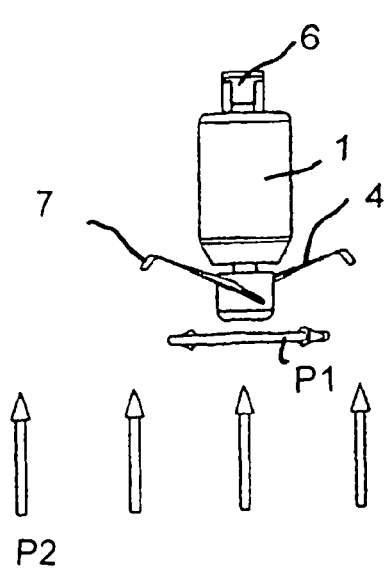
Figure 8:
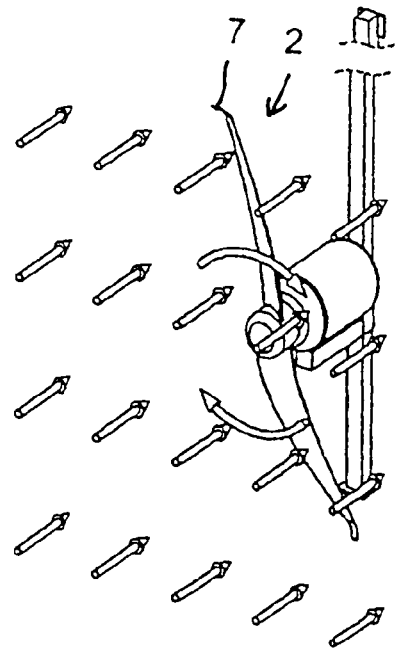
Figure 17:
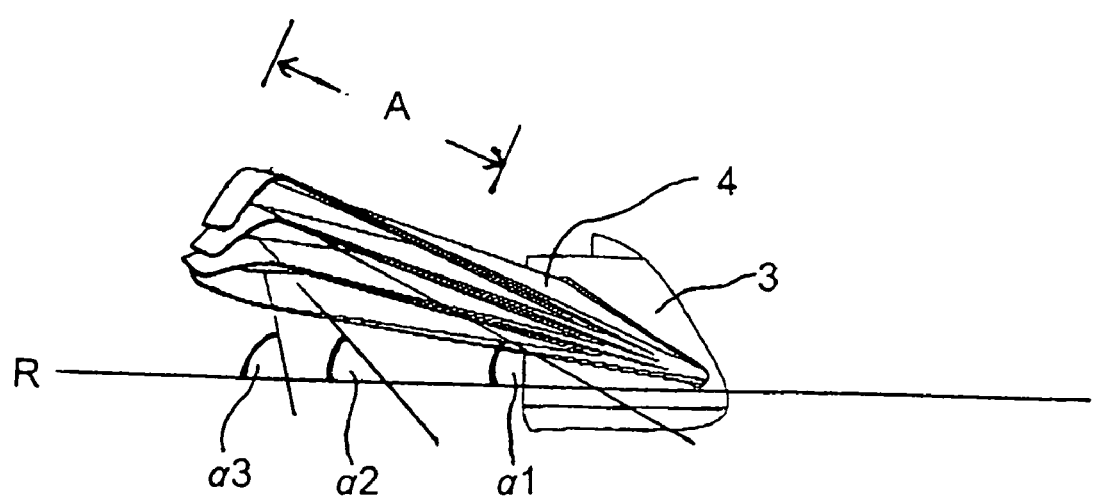

As shown in FIG. 3, a first profile pitch angle $\alpha 1$ of the blades 4 in relation to a radial plane R and a rotating direction of propeller 2 suggested by the arrows P1 and brought about by the submersible motor 1, are selected so that a horizontal main flow direction shown by the second arrows 22 is produced by propeller 2 in the direction of the submersible motor 1. As can be clearly seen in FIGS. 1 to 4, there is no flow hindrance on the suction side of the propeller 2 so that, in this way, liquid can be efficiently accelerated in a horizontal direction as per the second arrows P2.

With the second horizontal agitator shown in FIGS. 5 to 8, radial, outer end sections 7 of the blades 4 are bent in a direction opposite to the main flow direction suggested by the second arrows P2. The aforementioned horizontal main flow direction P2 runs essentially parallel to the also horizontally running rotary axis of the propeller 2. As is particularly shown in FIG. 6, a bending angle $\beta$ is positioned at an angle of about 55° here in relation to a radial plane R. However, the bending angle $\beta$ can also be larger or smaller and is preferably within a range between 30 and 90°. It is particularly shown in FIG. 5 that the end sections 7 have a length which corresponds to a maximum of one fifth of the radius of the blades 4. In the exemplary embodiment which is shown the end sections 7 only extend one tenth of the radial length of the blades 4.

Moreover, the end sections 7 have a curve running opposite to the rotating direction of the rotor 2 as suggested with the arrows P1. The suggested curve counteracts a catching of braid-generating impurities.

FIGS. 9 to 12 show a third horizontal agitator on which the propeller 2 is formed the same as with the second horizontal agitator. In turn, the propeller 2 has bent end sections 7. With the third horizontal agitator, plate-shaped flow conducting elements 8 extending in an axial plane running through the rotary axis of propeller 2 are provided downstream of the propeller 2. The flow conducting elements 8 are attached to the column-like frame 6 as shown in the exemplary embodiment. Naturally, it is also possible to fix the flow conducting elements 8 to the submersible motor 1 or to the carriage 5. The flow conducting elements 8 extend from the submersible motor 1 in the radial direction to a first radius R1 which is greater than or equal to a second radius R2 of the propeller 2. The first radius R1 can preferably be 1.0 to 1.3 times the second radius R2.

As is particularly shown in FIG. 10, leading edges 9 are positioned at an inclination in relation to the radial plane R. An angle of inclination $\gamma$ opens radially to the outside and is preferably 5 to 25°. Instead of a straight and inclined leading edge 9, a curved leading edge 9 can also be provided whose curve is directed towards the main flow direction P2.

Instead of the submersible motor 1, a drive unit can also be provided which comprises a gear unit in addition to the submersible motor 1.

FIGS. 13 to 17 show views of a fourth horizontal agitator.

In this connection, the blades 4 of the propeller 2 are made from a composite material in which fibers are contained in a plastic matrix. The elasticity of the blades 4 is set by the suitable selection, combination and arrangement of the fibers in the composite material so that particularly an outer section A is elastically deformed by the pressure of the liquid. When suitable material design is used, the elastic deformation takes place such that a profile pitch angle of the outer section A increases in comparison with the vertical radial plane R running through the rotary axis as the pressure of the liquid increases. As is particularly shown in FIG. 17, in particular an outer section A of the blades 4 twists as the liquid pressure or the speed increases. A first pitch angle $\alpha 1$ specifies the shape of the blades at a low speed. A second pitch angle $\alpha 2$ specifies the shape of the blades at a medium speed. And a third pitch angle $\alpha 3$ specifies the shape of the blades at a high speed. The pitch angle of the blades 4 increases in relation to the radial plane R as the speed or liquid pressure increases.

To set the desired elastic deformation of the blades 4 depending on the action on them of a liquid pressure, different fibers, for example carbon and/or aramid and/or highly stretched polyethylene fibers, can be combined with each other. Moreover, the desired elasticity properties can be influenced by the direction and the number of fiber layers as well as by the thickness of the profile.

In accordance with a particularly advantageous embodiment, it is provided that the total propeller has a weight which corresponds to the amount of water or waste water displaced by its volume, i.e., the propeller is so heavy that it will not rise when it is submerged in the waste water. For this purpose, the composite material can be provided with metallic particles or metallic inserts which are made of lead, for example.

LIST OF REFERENCE SIGNS

1 Submersible motor
2 Propeller
3 Hub
4 Blade
5 Carriage
6 Frame
7 End section
8 Flow conducting element
9 Leading edge
R Radial plane
R1 First radius
R2 Second radius
A Outer section
P1 Rotating direction of the propeller
P2 Axial main flow direction
$\alpha 1$ First pitch angle
$\alpha 1$ Second pitch angle
$\alpha 3$ Third pitch angle
$\beta$ Bending angle
$\gamma$ Angle of inclination of the leading edge

The invention claimed is:

1. A horizontal agitator for producing a horizontal flow in a clearing basin, comprising:
    a propeller having a plurality of blades arranged vertically on the propeller for producing the horizontal flow, and a submersible motor connected axially to the propeller and arranged downstream of the propeller;
    plate-shaped flow conducting elements arranged downstream of the propeller and extending in at least one axial plane;
    a frame to hold the submersible motor wherein the flow conducting elements are attached to the frame; and
    a vertical movement unit disposed on the frame to which the submersible motor or a drive unit comprising the submersible motor is fixed,
    wherein during an operation of the submersible motor, the horizontal flow is produced in the direction from the propeller to the submersible motor and the plate-shaped flow conducting elements.

2. A horizontal agitator as defined in claim 1, wherein the flow conducting elements are made of a sheet metal or fiber-reinforced plastic.

3. A horizontal agitator as defined in claim 1, wherein the flow conducting elements extend in a vertical plane and/or a horizontal plane.

4. A horizontal agitator as defined in claim 1, wherein, with increasing radial distance, a leading edge of each of the flow conducting elements has an inclination or curve directed to the horizontal flow direction.

5. A horizontal agitator as defined in claim 1, wherein an elastic deformation of each of the blades is made from an elastically deformable material to increase a profile pitch angle at least in the area of a radial, outer section in correlation with increasing rotation speed.

6. A horizontal agitator as defined in claim 1, wherein the blades are made from a composite material being reinforced with fibers.

7. A horizontal agitator as defined in claim 6, wherein a matrix of the composite materials is made of plastic.

8. A horizontal agitator as defined in claim 6, wherein the composite material comprises a fibres carbon and/or aramid and/or highly stretched polyethylene fibers.

9. A horizontal agitator as defined in claim 1, wherein the propeller has a density in a range from 0.9 to 1.1 g/cm³.

10. A horizontal agitator as defined in claim 1, wherein each of the plate-shaped flow conducting elements is vertically displaced above and below the motor.

11. A horizontal agitator for producing a horizontal flow in a clearing basin, comprising:
    a propeller having a plurality of blades arranged vertically on the propeller for producing the horizontal flow, and a submersible motor connected axially to the propeller and arranged downstream of the propeller; and
    plate-shaped flow conducting elements arranged downstream of the propeller and extending in at least one axial plane,
    wherein during an operation of the submersible motor, the horizontal flow is produced in the direction from the propeller to the submersible motor and the plate-shaped flow conducting elements, and
    wherein radial, outer end sections of the blades are bent in a direction opposite to the horizontal flow direction produced by the propeller.

12. A horizontal agitator as defined in claim 11, wherein the bent end sections have a curve opposite to a rotating direction of the propeller.

13. A horizontal agitator as defined in claim 11, wherein a maximum length of the end section is ⅕ of a radius of the blade.

* * * * *